United States Patent
Fridental et al.

(10) Patent No.: US 10,446,136 B2
(45) Date of Patent: Oct. 15, 2019

(54) ACCENT INVARIANT SPEECH RECOGNITION

(71) Applicant: ANTS TECHNOLOGY (HK) LIMITED, Hong Kong (HK)

(72) Inventors: Ron Fridental, Shoham (IL); Ilya Blayvas, Rehovot (IL); Pavel Nosko, Yavne (IL)

(73) Assignee: ANTS TECHNOLOGY (HK) LIMITED, Hong Kong (HK)

(*) Notice: Subject to any disclaimer, the term of this patent is extended or adjusted under 35 U.S.C. 154(b) by 44 days.

(21) Appl. No.: 15/592,222

(22) Filed: May 11, 2017

(65) Prior Publication Data

US 2018/0330719 A1 Nov. 15, 2018

(51) Int. Cl.
| | |
|---|---|
| G10L 15/065 | (2013.01) |
| G10L 15/10 | (2006.01) |
| G10L 15/06 | (2013.01) |
| G10L 15/16 | (2006.01) |
| G10L 15/02 | (2006.01) |
| G10L 15/14 | (2006.01) |

(52) U.S. Cl.
CPC ......... *G10L 15/065* (2013.01); *G10L 15/063* (2013.01); *G10L 15/10* (2013.01); *G10L 15/14* (2013.01); *G10L 15/16* (2013.01); *G10L 2015/025* (2013.01); *G10L 2015/0631* (2013.01)

(58) Field of Classification Search
CPC .......................... G10L 15/187; G10L 15/063
USPC ................................................ 704/244, 254
See application file for complete search history.

(56) References Cited

U.S. PATENT DOCUMENTS

| | | | | |
|---|---|---|---|---|
| 8,583,432 B1* | 11/2013 | Biadsy | ............... | G10L 15/18 704/10 |
| 9,779,730 B2* | 10/2017 | Hong | ............... | G10L 15/187 |
| 9,922,643 B2* | 3/2018 | Nissan | ............... | G10L 15/063 |
| 2002/0111805 A1* | 8/2002 | Goronzy | ............... | G10L 15/065 704/250 |
| 2003/0125945 A1* | 7/2003 | Doyle | ............... | G10L 15/01 704/246 |
| 2004/0243412 A1* | 12/2004 | Gupta | ............... | G10L 15/07 704/254 |
| 2004/0249639 A1* | 12/2004 | Kammerer | ............... | G10L 15/063 704/249 |
| 2006/0020462 A1* | 1/2006 | Reich | ............... | G10L 15/187 704/254 |

(Continued)

*Primary Examiner* — Shaun Roberts
(74) *Attorney, Agent, or Firm* — Soroker Agmon Nordman (57) ABSTRACT

A system and method for accent invariant speech recognition comprising: maintaining a database scoring a set of language units in a given language, and for each of the language units, scoring audio samples of pronunciation variations of the language unit pronounced by a plurality of speakers; extracting and storing m the database a feature vector for locating each of the audio samples in a feature space; identifying pronunciation variation distances, which are distances between locations of audio samples of the same language unit in the feature space, and inter-unit distances, which are distances between locations of audio samples of different language units in the feature space; calculating a transformation applicable on the feature space to reduce the pronunciation variation distances relative to the inter-unit distances; and based on the calculated transformation, training a processor to classify as a same language unit pronunciation variations of the same language unit.

8 Claims, 6 Drawing Sheets

(56) References Cited

U.S. PATENT DOCUMENTS

| | | | | |
|---|---|---|---|---|
| 2007/0162281 A1* | 7/2007 | Saitoh | ............... | G06F 17/2795 |
| | | | | 704/251 |
| 2007/0294082 A1* | 12/2007 | Jouvet | ................ | G10L 15/005 |
| | | | | 704/231 |
| 2008/0147404 A1* | 6/2008 | Liu | ................ | G10L 15/005 |
| | | | | 704/256.2 |
| 2009/0119105 A1* | 5/2009 | Kim | ................ | G10L 15/07 |
| | | | | 704/244 |
| 2010/0131262 A1* | 5/2010 | Gruhn | ................ | G10L 15/144 |
| | | | | 704/8 |
| 2010/0145698 A1* | 6/2010 | Chen | ................ | G09B 7/02 |
| | | | | 704/256.1 |
| 2011/0119051 A1* | 5/2011 | Li | ................ | G10L 15/065 |
| | | | | 704/10 |
| 2011/0295590 A1* | 12/2011 | Lloyd | ................ | G10L 15/065 |
| | | | | 704/8 |
| 2012/0278061 A1* | 11/2012 | Weinstein | ............ | G10L 15/005 |
| | | | | 704/2 |
| 2013/0191126 A1* | 7/2013 | Thambiratnam | ..... | G10L 15/187 |
| | | | | 704/245 |
| 2014/0058731 A1* | 2/2014 | Tyagi | ................ | G10L 15/063 |
| | | | | 704/243 |
| 2016/0027437 A1* | 1/2016 | Hong | ................ | G10L 15/187 |
| | | | | 704/254 |
| 2017/0169815 A1* | 6/2017 | Zhan | ................ | G10L 15/075 |

* cited by examiner

ACCENT INVARIANT SPEECH RECOGNITION

FIELD OF THE INVENTION

The present disclosure generally relates to speech recognition, and more specifically to speech recognition method suitable for speakers from various populations.

BACKGROUND

In some known speech recognition methods, words are recognized by spectral analysis, and by applying an extracted feature vector of a certain audio segment as an input to a pre-trained learning engine, that may obtain the prior probabilities of the words from a dictionary and/or a certain linguistic model.

A linguistic model is sometimes obtained by estimating probabilities of word occurrences based a plurality of texts and/or ground-truth marked audio streams. The learning engine is usually trained over pre-recorded audio samples of a target application dictionary, as spoken by a certain target, population, recorded on a target hardware, and in the target environment conditions.

REFERENCES

Please not the following list of references:
1. [BH Juang, 2005] B. H. Juang and L. R. Rabiner, "Automatic speech recognition—A brief history of the technology development" in Elsevier Encyclopedia of Language and Linguistics, Amsterdam, The Netherlands: Elsevier, 2005.
2. [I Blayvas 2006] I. Blayvas, et. al. Linear Dimensionality Reduction for Classification, Technion, Technical Report CS-2006-04.
3. [GH Golub 2012] Golub, Gene H., and Charles F. Van Loan. Matrix computations. Vol. 3. JHU Press, 2012.
4. [S. Mobin 2016] Shariq A. Mobin, Joan Bruna, Voice Conversion using Convolutional Neural Networks, UC Berkeley.
5. [S. Mobin 2016] Shariq A. Mobin, Joan Bruna. Voice Conversion using Convolutional Neural Networks, UC Berkeley.
6. [Ian GoodFellow 2014] Ian GoodFellow et.al. Generative Adversarial Nets.

SUMMARY

According to an aspect of some embodiments of the present invention there is provided a method for accent invariant speech recognition including maintaining a database storing a set of language units in a given language, and for each of the language units, storing audio samples of pronunciation variations of the language unit pronounced by a plurality of speakers; extracting and storing in the database a feature vector for locating each of the audio samples in a feature space; identifying pronunciation variation distances, which are distances between locations of audio samples of the same language unit in the feature space, and inter-unit distances, which are distances between locations of audio samples of different, language units in the feature space; calculating a transformation applicable on the feature space to reduce the pronunciation variation distances relative to the inter-unit distances; and based on the calculated transformation, training a processor to classify as a same language unit pronunciation variations of the same language unit.

Optionally, the language units are words or phonemes.

Optionally, the method includes receiving an input audio signal; applying the calculated transformation on the input signal; and recognizing a language unit in said input audio signal, by applying classification by said processor.

Optionally, recognizing a language unit comprises adjusting classification based on language statistics.

Optionally, the training comprises applying the calculated transformation to the samples of pronunciation variations stored in the database.

Optionally, the calculated transformation comprises a Linear Discriminant Analysis (LDA) transformation.

Optionally, the stored audio samples are of pronunciation variations of the language unit pronounced by a plurality of speakers of different ethnic groups.

According to an aspect of some embodiments of the present invention there is provided a method for accent invariant speech recognition including maintaining a database storing a set of language units in a given language, and for each of the language units, storing audio samples of pronunciation variations of the language unit pronounced by a plurality of speakers with known accents, wherein the audio samples are indexed according to the language unit and accent included in the sample; and training a processor to classify an audio signal as a corresponding language unit for a given accent.

Optionally, the method includes receiving an input audio signal; in case an accent of the received audio signal is identified, applying classification for the identified accent by said processor, thus recognizing a language unit in said input audio signal; and in case an accent of the received audio signal is not identified: applying separate classification for each of the known accents, thus recognizing a language unit in said input audio signal for each of the known accents; and selecting the most probable recognized language unit.

According to an aspect of some embodiments of the present invention there is provided a method tor accent invariant speech recognition including maintaining a database storing a set of language units in a given language, and for each of the language units, storing one or more standard pronunciation audio sample and a plurality of variant, audio samples of pronunciation variations of the language unit pronounced by a plurality of speakers; for each sample, extracting a descriptor and storing the descriptor in the database, thus obtaining at least one standard descriptor and a group of variant descriptors; training a processor to produce a transformation procedure for transforming the variant descriptors to the standard descriptor and a discriminative procedure to distinguish between the standard descriptor and the transformed variant descriptors, until the transformed variant descriptors are indistinguishable from the standard descriptor; receiving an input audio signal; and by the trained transformation procedure, transforming the input audio signal to a modified signal indistinguishable from the respective standard pronunciation sample.

BRIEF DESCRIPTION OF THE DRAWINGS

Some non-limiting exemplary embodiments or features of the disclosed subject matter are illustrated in the following drawings.

In the drawings.

With specific reference now to the drawings in detail, it is stressed that the particulars shown are by way of example and for purposes of illustrative discussion of embodiments of the invention. In this regard, the description taken with the drawings makes apparent to those skilled in the art how embodiments of die invention may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspective or Item different point of views.

DETAILED DESCRIPTION

Some embodiments of the present invention provide a system and method that enable efficient and accurate speech recognition that is invariant to various accents.

Some embodiments of the present invention provide solutions to a problem rising with respect to speech recognition software, which is the difficulty in recognizing the speech elements such as words and/or phonemes when there are, for example, various non-native speaking customers, having significant accent and impacting the software performance from significant degradation to complete failure.

Some solutions provided by some embodiments of the present invention overcome this problem by transformations applied on the feature vectors of audio samples, by training of the speech recognition engine based on the transformed vectors and by corresponding transformation of incoming audio stream fed to the speech recognition engine. The transformations include time, spectral and/or cepstral domain transformations of signal representation.

The provided methods are applicable to speech recognition implementations ranging from voice command recognition (VCR) through natural language processing (NLP). In some embodiments, the provided methods are applied at the phoneme level, wherein the samples, training, and database entries are phonemes of a language rather than words. A phoneme is a sound or a group of different sounds perceived to have the same function by speakers of the language or dialect in question. For example, the English phoneme /k/ occurs in words such as cat, kit, scat and skit.

Some embodiments of the present invention may include a system, a method, and/or a computer program product. The computer program product may include a tangible non-transitory computer readable storage medium (or media) having computer readable program instructions thereon for causing a processor to carry out aspects of the present invention. Computer readable program infractions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including any object oriented programming language and/or conventional procedural programming languages.

Before explaining at least one embodiment of the invention in detail, it is to he understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
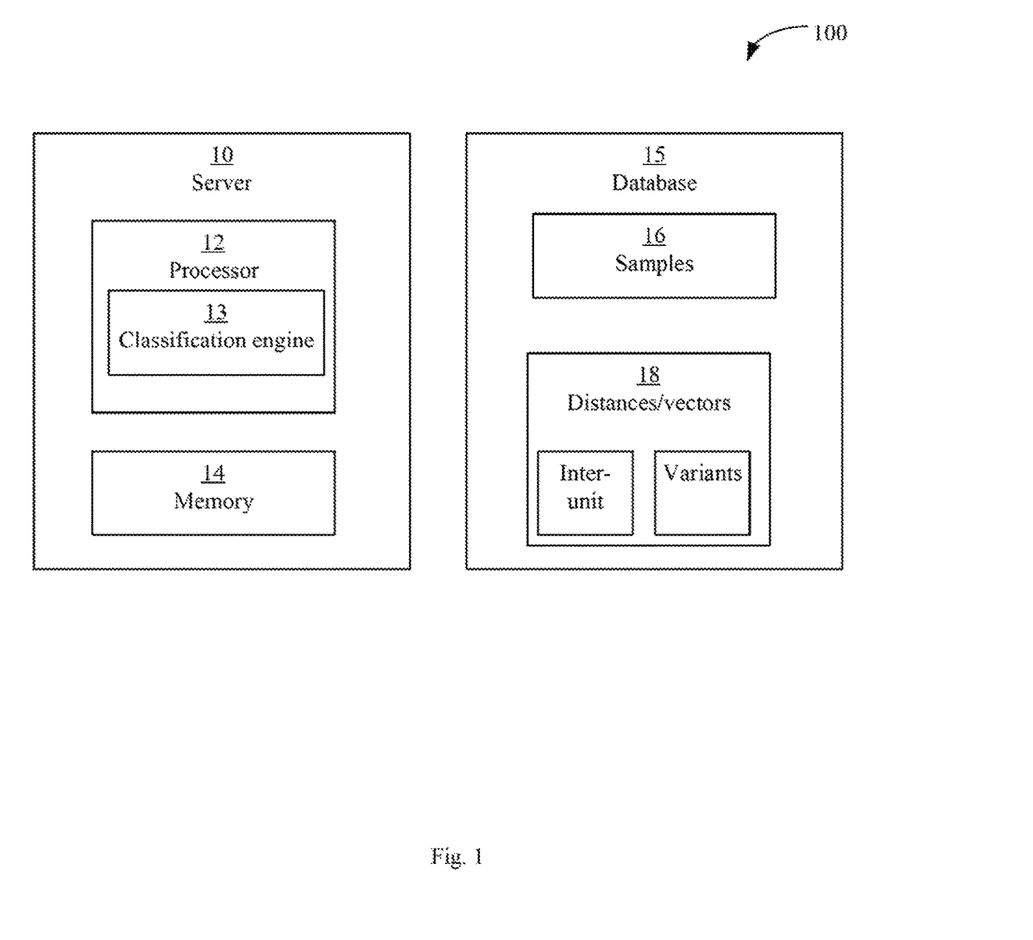
FIG. 1. is a schematic illustration of a system for accent invariant speech recognition, according to some embodiments of the present invention.

Reference is now made to FIG. 1, which is a schematic illustration of a system 100 for accent invariant speech recognition, according to some embodiments of the present invention.

System 100 may include a speech recognition server 10 and a database 15, which may be controlled by, be included in and/or communicate with server 10. Server 10 may include at least one hardware processor 12 and a non-transitory memory 14, which may store code instructions executable by processor 12. Once executed by processor 12, the code instructions may cause processor 12 to perform the actions and/or methods described herein.

Database 15 may store a set of language units such as, for example, words and/or phonemes. For example, processor 12 may parse a dictionary or any other suitable language unit source to extract the language units and store then in database 15.

For each stored language unit, database 15 may store a plurality of audio samples of pronunciation variations that belong to a certain language unit, e.g. samples of the language unit pronounced by a plurality of speakers. For example, database 15 may store a plurality of audio samples indexed according to the respective stored language units. For example, the stored audio samples are of pronunciation variations of the language unit as pronounced by a plurality of speakers of different ethnic groups. In some embodiments, an audio sample may include multiple language units, i.e. multiple words and/or phonemes, and/or the same language unit pronounced more than once. For example, an audio unit may include multiple language units or multiple instance of the same unit, and may be stored with indication of which. language units and/or instances are included in the sample and/or in which order.

In some embodiments of the present invention, database 15 stores the plurality of audio samples 16 indexed according to a plurality of features extracted by processor 12, for example as described in more detail herein. Based oh the extracted features, processor 12 may calculate measures of difference between the audio samples. For example, processor 12 obtains for an audio sample a respective feature vector and/or a location of the audio sample in a respective feature space. For example, processor 12 calculates the distances between the audio samples in the feature space.

As described in more detail herein, processor 12 may receive an input audio signal and classify it according to respective language units, i.e. identify the language unit pronounced in the input audio signal. For example, processor 12 may extract for the input signal a feature vector and/or location in the feature space, and identify based on the location and/or vector to which language unit the input signal belongs. In some embodiments, for example in order to enhance the distinction between the language units, processor 12 may calculate and/of apply a transformation on the feature space, which makes the distances between samples which belong to different language units larger relative to the distances between samples that belong to the same language unit.

For example, processor 12 may calculate and store the distances 18 in database 15, indexed as pronunciation variation distances, e.g. a class of distances between samples that belong to the same language unit, or as inter-unit distances, e.g. a class of distances between samples which belong to different language units. Processor 12 may calculate a representative value, such as a root mean square or any other suitable value, for the distances in each of the classes. Then, for example, processor 12 calculates and/or applies a transformation on the feature space which reduces the pronunciation variation distances relative to the inter-unit distances.

In other words, the feature space includes, for example, a first sub-space spanned by distances between different classes, e.g. different words of the dictionary or other source, and a second sub-space spanned by distances between different instances within the same class, e.g. different pronunciations of the same word by different speakers, or by speakers of different ethnicity groups and/or accents. The second sub space constitutes an estimated probability density distribution of a certain word within the feature space, defined by the vectors, representing the different pronunciations of the same word. Processor 12 may calculate and/or apply a transformation on the feature space which maximizes the first sub-space relative to the second sub-space.

As described in more detail herein, by applying the transformation, processor 12 may train a classification engine 13 to classify pronunciation variations of a same speech unit, as the same speech unit, for example after applying the calculated transformation to the audio samples stored in the database. For example, processor 12 may apply the calculated transformation on a received input audio signal, and apply classification by executing engine 13, according to the transformed feature space. Thus, for example, processor 12 recognizes a language unit in the input signal, for example if the input signal belongs to one of the stored language units. Classification engine 13 can be of any type such as Gaussian Mixture Model (GMM), Support Vector Machines (SVM), Radial Basis Function (RBP), Multilayer Neural Networks, Convolutional Neural Networks (CNN) etc. The calculated transformation of the feature space can he any linear or non-linear transformation, facilitated by matrix multiplication, application of the formula, by multilayer neural network.

In some embodiment of the present invention, an audio sample and/or an input signal may be obtained from a longer audio segment. For example, processor 12 may apply a voice detector to an audio segment, thus, for example, detecting vocal periods, i.e. periods when the voice is present. Processor 12 may extract from the vocal periods sections of certain time intervals. For example, the time intervals may include overlapping time intervals, for example of 0.1 to 5 seconds.

Figure 2:
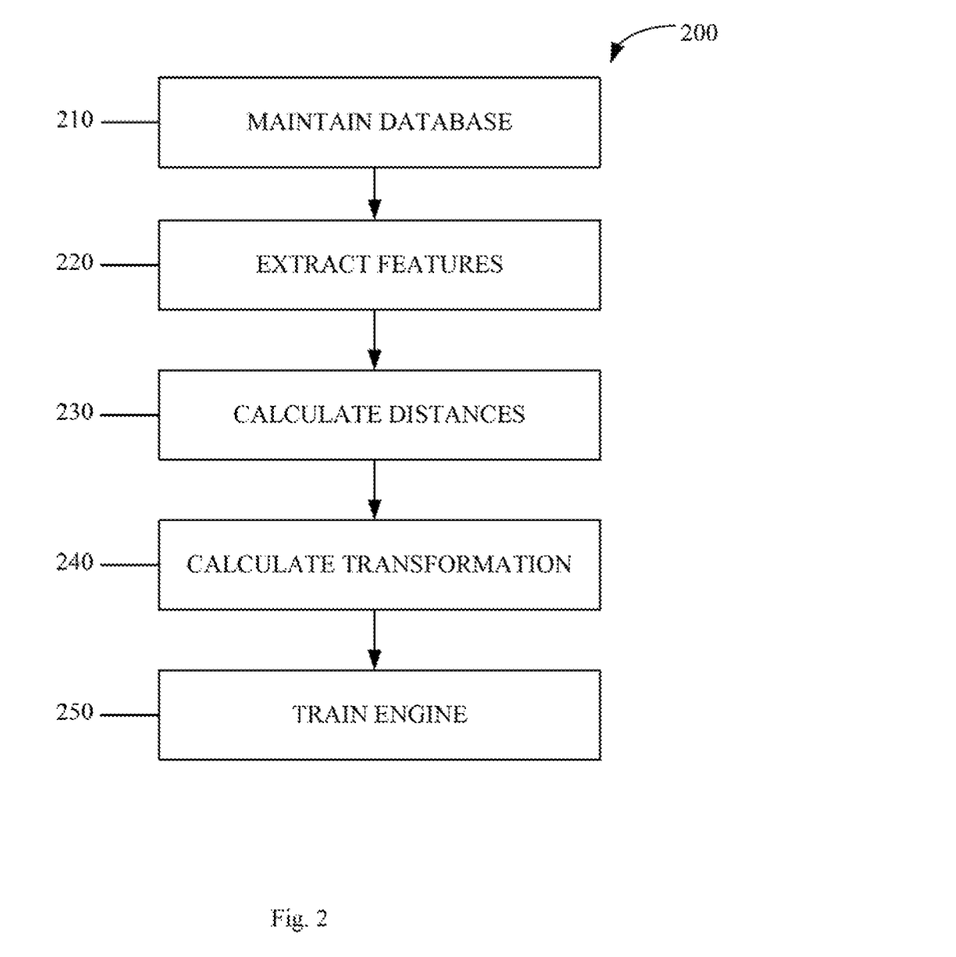
FIG. 2 is a schematic flowchart illustrating a method for training of a processor and/or a classification engine for accent invariant speech recognition, according to some embodiments of the present invention.

Reference is now made to FIG. 2, which is a schematic flowchart illustrating a method 200 for training of processor 12 and/or classification engine 13 for accent invariant speech recognition, according to some embodiments of the present invention. As indicated in block 210, processor 12 may store in and/or maintain database 15 of audio samples indexed according to the language units.

As indicated in block 220, processor 12 may extract features of each of the audio samples. In some embodiments of the present invention, processor 12 may apply on each audio sample a transformation to the frequency domain and/or other manipulations in order to extract features of the audio sample.

Based on the extracted features, as described in detail herein, processor 12 may map the audio samples to a feature space and facilitate recognition of a language unit based on the location of an audio signal in the feature space. For example, processor 12 and/or engine 13 is trained to recognize language units based on the audio samples and their features. When a new input audio signal is received, processor 12 may extract features from the input signal in the same manner it is extracted from the audio samples, in order to recognize die language unit to which the input signal belongs. Therefore, the step of extracting features may be the same for an audio sample and for an input signal.

In some embodiments of the present invention, processor 12 may divide an audio sample to K time-frame signals. The time-frame signals may be overlapping. Each time-frame signal may be, for example, of 5 to 50 milliseconds. Processor 12 may convert each time-frame signal to a frequency domain, for example by applying a Fast Fourier Transform (FFT), thus, for example, obtaining a power spectrum of the time-frame signal. In some embodiments, processor 12 then obtains an inverse FFT to the logarithm of the power spectrum (a cepstrum) of the time-frame signal. In some embodiments, processor 12 may obtain from the cepstrum features of the time-frame signal. For example, processor 12 may divide the cepstrum to N bins logarithmically spread over the covered frequency range, for example 5 to 50 bins, and obtain for each of the bin a quantized representative energy value, i.e. N values that represent the cepstrum of the time-frame signal.

Therefore, processor 12 may obtain for each of the K time-frame signals N representative values, thus, for example, generating for each audio sample a feature vector of dimensionality K*N. In some embodiments, each of the K time-frame signals has additional representative values, such as an average energy value over the N bins, and/or derivative value(s) of signal first and second derivatives in time representing a rate and acceleration of change of the signal. Accordingly, each audio sample may be represented by a feature vector with greater dimensionality.

As indicated in block 230, processor 12 may calculate distances between the feature vectors. As indicated in block 240, processor 12 may calculate an accent invariant transformation that increases, for example maximizes, the distances between the inter-unit distances relative to the pronunciation variation distances. For example, the calculated transformation includes and/or constitutes a Linear Discriminant Analysis (LDA) trans formation.

As indicated in block 250, processor 12 may tram engine 13 to classify audio signals according to the language units. First, for example, processor 12 may transform by the calculated accent in variant transformation the feature vectors of the stored audio samples. Then, processor 12 may train classification engine 13 for recognition of language units, based on the transformed feature vectors. The transformed input data becomes invariant or at least less variable by speaker accent, while classification engine 13 is actually trained for recognition of language units based on similarly transformed samples.

In some embodiments, processor 12 adjusts classification engine 13 to recognize a speech unit further based on language statistics. For example, processor 12 calculates and or adjusts classification engine 13 by content-independent use-probabilities of dictionary language units, i.e. words and/or phonemes. For example, processor 12 further adjusts the use-probabilities and/or classification engine 13 according to n-tuple language statistics for n previous language units, i.e. words and/or phonemes.

Figure 3:
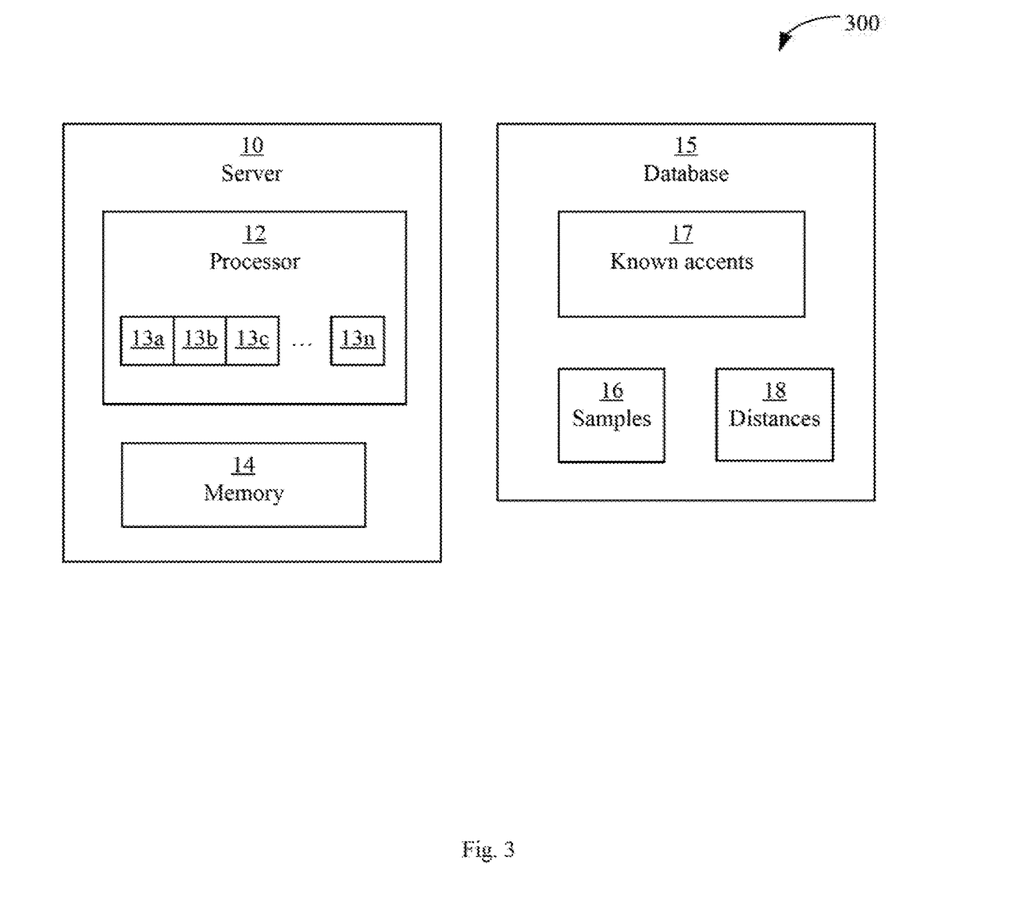
FIG. 3 is a schematic illustration of a system for accent invariant speech recognition, according to some embodiments of the present invention.

Reference is now made to FIG. 3, which is a schematic illustration of a system 101, for accent invariant speech recognition, according to some embodiments of the present invention. Database 15 may store a set 17 of known accent and/or ethnicity. Database 15 may store a set of language units in a given language, as described above, and for each of the language units, storing audio samples of pronunciation variations of the language unit pronounced by a plurality of speakers with known accents and/or ethnicities. The stored audio samples may be indexed according to the known accents and/or speaker ethnicities, i.e. for each stored audio sample it is indicated which of the known accents and/or speaker ethnicities are included in the sample. For example, each of the audio samples is indexed according to the language unit, as described in detail herein above, and accent and/or ethnicity included so the audio sample.

Figure 4:
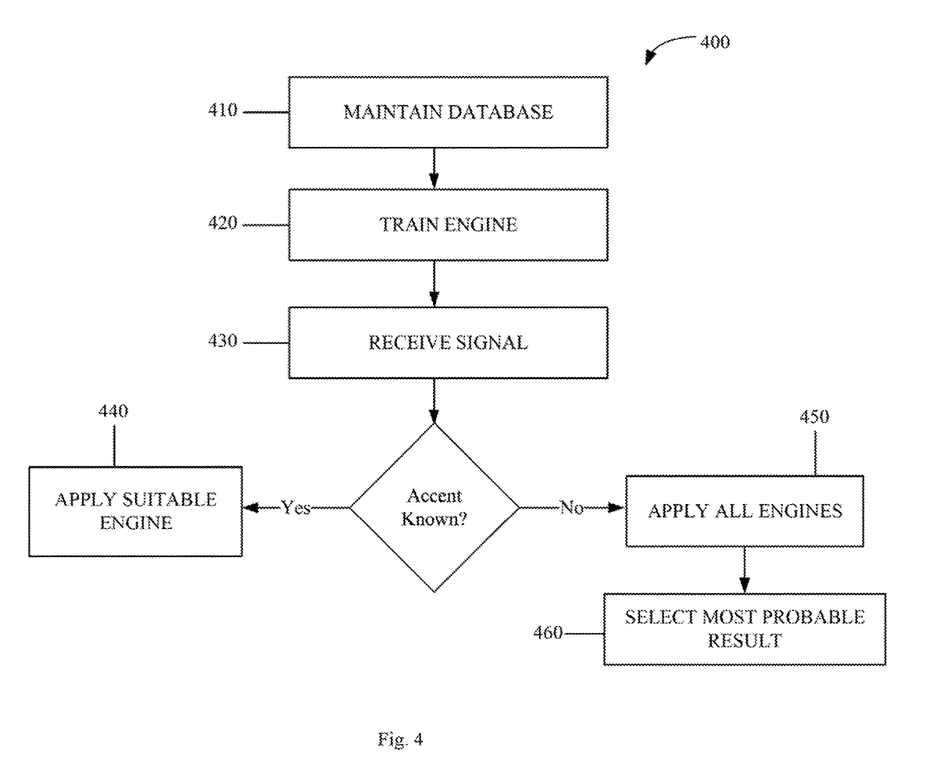
FIG. 4 is a schematic flowchart illustrating a method for accent invariant speech recognition, according to some embodiments of the present invention.

Further reference is now made to FIG. 4, which is a schematic flowchart illustrating a method 400 for accent invariant speech recognition, according to some embodiments of the present invention. As indicated in block 410, processor 12 may store in and/or maintain a database 15 of audio samples indexed according to the language units and the known accents and/or ethnicities included in the audio samples. As indicated in claim 420, processor 12 may train engine 13 to classify audio signals according to the language units for a given accent and/or ethnicity. For example, processor 12 may train multiple classification engines 13a-13n, a separate engine for each accent and/or ethnicity, each based on audio samples that include the corresponding accent and/or ethnicity.

As indicated in block 430, processor 12 may receive an input audio signal and check whether the speaker accent and/or ethnicity is known and/or identified. For example, the speaker's accent may be identified based on a location of the speaker, localization of the device, menu language settings and/or based on any other suitable indication.

As indicated in block 440, in case the speaker's accent is known and/or identified, processor 12 may apply the corresponding classification engine of engines 13a-13n for the identified accent by said processor, thus recognizing a language unit in the input audio signal.

As indicated in block 450, in case an accent of the received audio signal is not known and/or identified, processor 12 may apply a corresponding separate classification engine of engines 13a-13n for each of the known accents thus recognizing a language unit in said input audio signal for each of the known accents. As indicated in block 460, processor 12 may calculate use probabilities for the recognized language unit, for example based on content-independent use-probabilities of dictionary language units, and/or based on n-tuple language statistics for n previous language units. Processor 12 may select the most probable recognized language unit.

Figure 5:
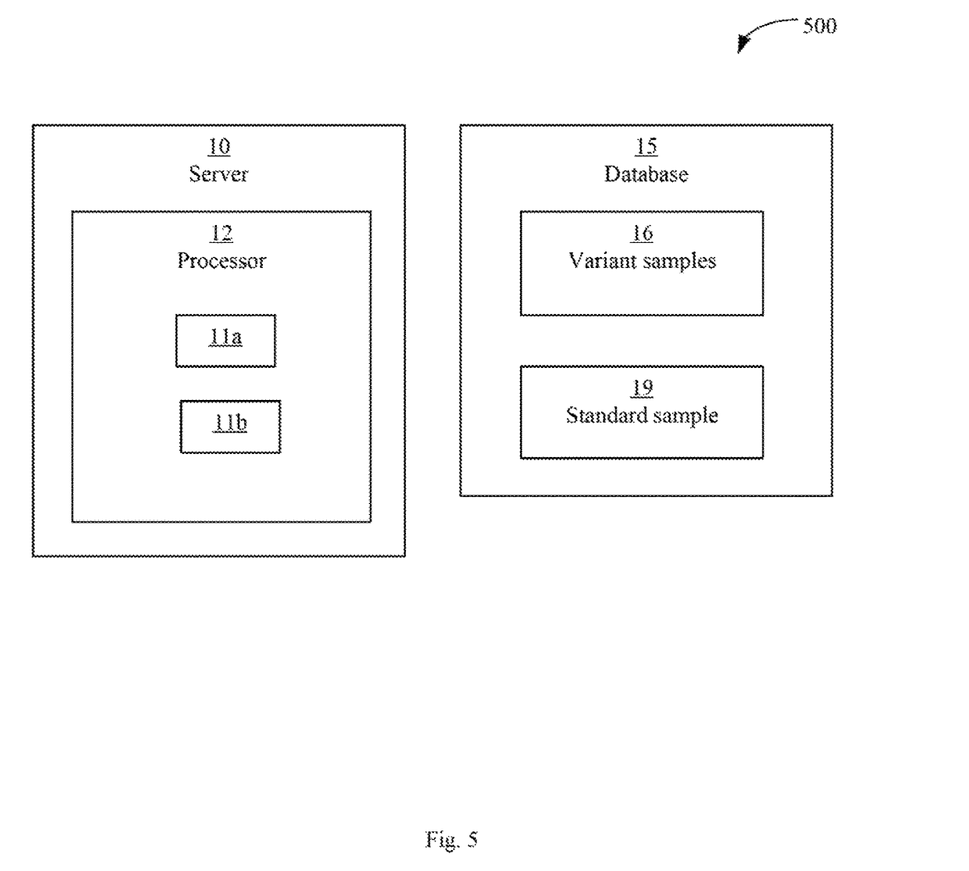
FIG. 5 is a schematic illustration of a system for accent invariant speech recognition, according to some embodiments of the present invention.

Reference is now made to FIG. 5, which is a schematic illustration of a system 102 for accent invariant speech recognition, according to some embodiments of the present invention. Database 15 may store, for each of the language units, a standard pronunciation audio sample 19 and a plurality of variant audio samples 16 of pronunciation variations of the language unit pronounced by a plurality of speakers.

Figure 6:
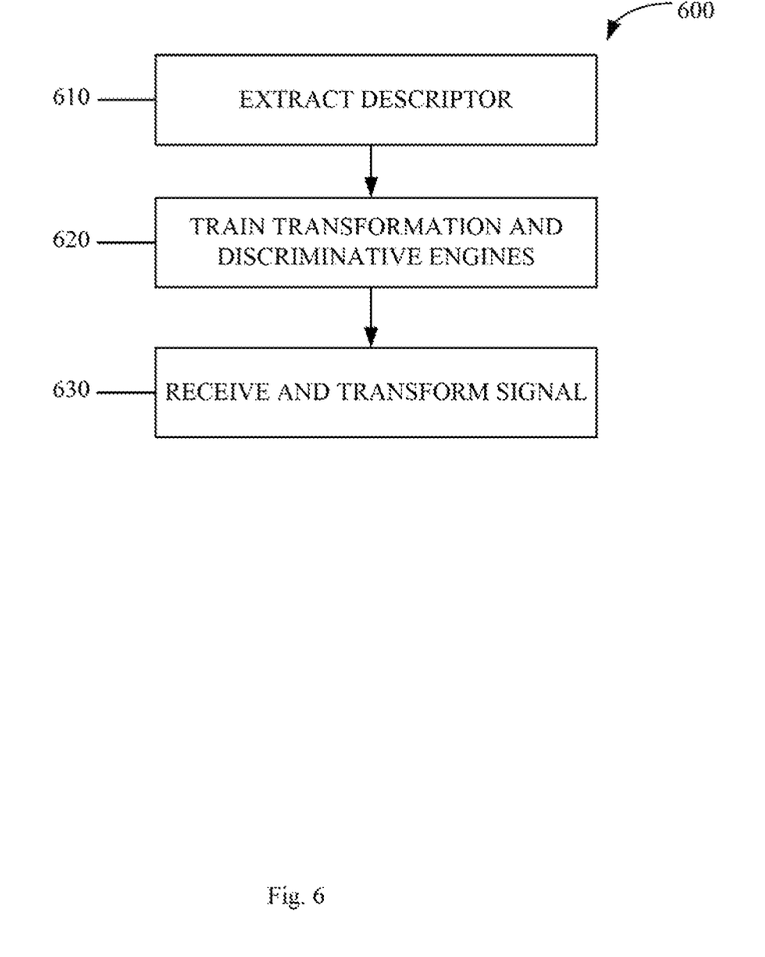
FIG. 6 is a schematic flowchart illustrating a method for accent invariant speech recognition, according to some embodiments of the present invention.

Reference is now made to FIG. 6, which is a schematic flowchart illustrating a method 600 for accent invariant speech recognition, according to some embodiments of the present invention. As indicated in block 610, processor 12 may extract a descriptor for each of audio samples 16 and 19, and store the descriptors in the database, thus obtaining at least one standard descriptor, i.e. the descriptor of standard sample 19, and a group of variant descriptors, i.e. the descriptors of variant samples 16. The descriptor may include, for example, of least some of the sample features obtained as described with reference to FIG. 2. Processor 12 may obtain the descriptor in the same manner features are obtained, for example as described with reference to FIG. 2.

As indicated in block 620, processor 12 may train a transformation procedure engine 11a to produce a transformation procedure for transforming the variant descriptors to the standard descriptor, e.g. to be as similar as possible to the standard descriptor. That can be a linear transformation, according to the Linear Discriminant Analysis (LDA). Independent Component Analysis (ICA), as well as any nonlinear transformation, expressed by a matrix, formula, algorithm or a neural network. Additionally, processor 12 may train a discriminative procedure engine 11b to produce a discriminative procedure to distinguish between the standard descriptor and the transformed variant descriptors, as long as the transformed variant descriptors are not indistinguishable from the standard descriptor, for example according to a predetermined threshold of distinguishabilty and/or inherent limitations of processor 12.

For example, processor 12 may extract a descriptor of a certain audio sample 16, transform the descriptor to the standard descriptor by transformation procedure engine 11a, and feed the obtained transformed descriptor to discriminative procedure engine 11b. In case discriminative procedure engine 11b doesn't distinguish between a transformed variant descriptor and a standard descriptor, processor 12 may update discriminative procedure engine 11b accordingly in order to adjust its parameters and/or to improve the discriminative procedure. However, in case the discriminative procedure engine 11b distinguishes between a transformed variant descriptor and a standard descriptor processor 12 may update transformation procedure engine 11a accordingly in order to adjust its parameters and/or to improve the transformation procedure.

In some embodiments, processor 12 may extract a standard descriptor of a certain audio sample 19, apply on the standard descriptor transformation by transformation procedure engine 11a, and feed the transformed standard descriptor to discriminative procedure engine 11b. In case discriminative procedure engine 11b distinguishes between a transformed standard descriptor and the extracted standard descriptor itself, processor 12 may update discriminative procedure engine 11b accordingly in order to adjust its parameters and/or correct an error in the discriminative procedure.

As indicated in block 630, processor 12 may receive an input audio signal, and by the trained transformation procedure, may transform the input audio signal to a modified signal indistinguishable from the respective standard pronunciation.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless other wise clearly evident from the context thereof.

The terms 'processor' or 'computer', or system thereof, are used herein as ordinary context of the art, such as a general purpose processor, or a portable device such as a smart phone or a tablet computer, or a micro-processor, or a RISC processor, or a DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or electronic circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry. The processor and program may constitute the same apparatus, at least partially, such as an array of electronic gates, such as FPGA or ASIC, designed to perform a programmed sequence of operations, optionally comprising or linked with a processor or other circuitry.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprising", "including" and/or "having" and other conjugations of these terms, when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for accent invariant speech recognition comprising:
   maintaining a database for storing a set of language units in a given language, wherein for each language unit, storing audio samples of pronunciation variations of the language unit pronounced by a plurality of speakers;
   extracting and storing in the database a feature vector for locating each of the audio samples in a feature space;
   identifying two types of distances: (i) pronunciation variation, which are distances between locations of audio samples of the same language unit with different pronunciations, in the feature space; and (ii) inter-unit distances, which are distances between locations of audio samples of different language units in the feature space;
   calculating a transformation applicable on the feature space to reduce the pronunciation variation distances relative to the inter-unit distancesm, the transformation is configured to make various pronunciation variations of the same language unit indistinguishable by a classification processor;
   when receiving an input audio:
      transforming the received signal to an accent-invariant audio signal by applying the calculated transformation on the input audio signal, wherein language units included in the accent-invariant audio signal are indistinguishable by the classification processor from other pronunciation variations of the same language units; and
      recognizing a language unit in said input audio signal, by applying classification by said classification processor.

2. The method of claim 1, wherein the language units are words or phonemes.

3. The method of claim 1, wherein recognizing a language unit comprises adjusting classification based on language statistics.

4. The method of claim 1 wherein said method further comprises applying the calculated transformation to the samples of pronunciation variations stored in the database.

5. The method of claim 1, wherein said calculated transformation comprises a Linear Discriminant Analysis (LDA) transformation.

6. The method of claim 1, wherein said calculated transformation is performed by an appropriately trained neural network.

7. The method of claim 1, wherein the stored audio samples are of pronunciation variations of the language unit pronounced by a plurality of speakers of different ethnic groups.

8. A method for accent invariant speech recognition comprising:

maintaining a database storing a set of language units in a given language, and for each language unit, storing audio samples of pronunciation variations of the language unit pronounced by a plurality of speakers with known accents, wherein the audio samples are indexed according to the language unit and accent integrated in the audio sample;

for each known accent:
identifying two types of distances: (i) pronunciation variation, which are distances between locations of audio samples of the same language unit with different pronunciations, in the feature space; and (ii) inter-unit distances, which are distances between locations of audio samples of different language units in the feature space;

calculating a transformation applicable on the feature space to reduce the pronunciation variation distances relative to the inter-unit distances, the transformation is configured to make various pronunciation variations of the same language unit and accent indistinguishable by a classification processor; and when receiving an input audio signal, in case accent of the received audio signal s recognized, applying classification for the recognized accent by said processor, thus recognizing a language unit in said input audio signal; and in case an accent of the received audio signal is not recognized:
applying a separate classification for each of the known accents, thus recognizing a language unit in said input audio signal for each of the known accents; and selecting the most probable recognized language unit, wherein applying classification for the recognized accent comprises transforming the received signal by applying on the input audio signal the corresponding calculated transformation, wherein language units included in the transformed audio signal are indistinguishable by the classification processor from other pronunciation variations of the same language units and accent.

* * * * *